Patented May 17, 1938

2,117,476

UNITED STATES PATENT OFFICE 2,117,476

ANTHRAQUINONE DYESTUFFS AND THEIR MANUFACTURE

Norman Hulton Haddock and Frank Lodge, Blackley, Manchester, England, assignors to Imperial Chemical Industries Limited, a corporation of Great Britain No Drawing. Application January 21, 1937, Serial No. 121,712. In Great Britain January 22, 1936

7 Claims. (Cl. 260—60)

This invention relates to new anthraquinone dyestuffs and their manufacture.

These dyestuffs are distinguished by having a carboxylic ester group containing an alkyl or alkenyl radical with 8–18 carbon atoms, this group being attached to an $\alpha$-phenylamino substituent in the anthraquinone nucleus. The dyestuffs also carry a hydroxy, amino, or methylamino group in the position para to the above phenylamino group, and they also carry a sulfonic acid group or groups. The dyestuffs may also carry up to two additional halogen or methyl substituents.

We make the new dyestuffs by esterifying the corresponding free carboxylic acids or by sulfonating the corresponding unsulfonated carboxylic esters. We sulfonate either by treating with a sulfonating acid or when there is bromo or chloro substituent in the position meta to the above arylamino group by treating with a soluble sulfite or by both methods.

One or more carboxylic ester groups may be present although valuable dyestuffs can be made with one only. Sufficient sulfonic acid groups must be present to give the dyestuff sufficient solubility, to be used in dyeing animal fibres.

The presence of the alkyl or alkenyl radical improves the fastness to washing of dyeings on animal fibres.

The free carboxylic acids used as starting materials are in some cases known compounds. They may be made for example by interacting a 1-bromo- or -chloro-4-hydroxy-, amino-, or -methylamino-anthraquinone with an o-, m-, or p-aminophenylcarboxylic acid and then sulfonating. They may also be made by interacting a 1:3-dibromo- or -dichloro-4-hydroxy-, -amino-, or -methylamino-anthraquinone with an o-, m-, or p-aminophenylcarboxylic acid and then sulfonating either with a sulfonating acid or when suitable by replacing the remaining bromo or chromo substituent in the resulting compound with a sulfonic acid group by using sodium sulfite, or sulfonating by both methods. They may also be made by interacting a 1-bromo- or -chloro- 4-hydroxy-, -amino-, -methylamino-anthraquinone-3-sulfonic acid with an o-, m-, or p-aminophenylcarboxylic acid.

The carboxylic esters used as starting materials are new compounds, and may be made by esterifying the corresponding carboxylic acids.

In making the new dyestuffs, the esterification may be effected, for instance, by heating together the free carboxylic acid and alcohol with an esterification catalyst: suitable catalysts are concentrated sulfuric acid and chlorosulfonic acid. Examples of alcohols used in the esterifications are octyl, decyl, otherwise known as decanol, dodecyl, tetradecyl, hexadecyl, octadecyl, and octadecenyl. Hexadecyl alcohol is the main or sole component of the alcohols obtained by the saponification of spermaceti: if this is obtained by the saponification of spermaceti its purity may depend upon the purity of the spermaceti. Octodecenyl alcohol, otherwise known as oleyl alcohol is an unsaturated alcohol; it is made by the reduction of oleic acid. Dodecyl and tetradecyl, otherwise known as myristyl alcohol, are obtained by the reduction of the mixed fatty acids obtained from coconut oil and palm oil. Other alcohols are likewise obtainable by reduction of the fatty acids of natural fats and oils (see, for instance, Bouveault and Blanc, Bull. Soc. Chem., Series 3, vol. 31, pages 674 et seq. and 1210 et seq.). The alcohols include mixed alcohols, for instance, technical "Lorol" which consists of the mixed alcohols from coconut oil fatty acids.

Examples of alkyl and alkenyl radicals with 8–18 carbon atoms, are the alkyls of the above-mentioned alcohols.

An object of the present invention is the provision of the above-mentioned new compounds. Another object is the provision of processes for the production of the above new compounds. Further objects will appear hereinafter.

The following examples, in which parts are by weight, illustrate but do not limit the invention.

*Example 1.*—50 parts of 1-amino-4-m-carboxyanilinoanthraquinone-2-sulfonic acid, 250 parts of dodecyl alcohol and 10 parts of 100% sulfuric acid are heated together at 150° C. for 30 minutes, i. e. until esterification of the carboxylic acid is complete. Water produced during the reaction is allowed to escape. The mixture is cooled to 100° C., 750 parts of ligroin (B. P. 60–80° C.) are added and the product filtered cold and washed with ligroin. It is dissolved in 300 parts of water at 80° C., neutralized with sodium carbonate, the solution filtered hot and the dyestuff precipitated with salt. It is filtered cold, washed with 5% salt solution and dried at 100° C.

The so-obtained new dyestuff 1-amino-4-m-carbododecoxyanilinoanthraquinone - 2 - sulfonic acid is a blue powder which dissolves in concentrated sulfuric acid with a greenish-blue colour and in hot water to a bright blue frothy solution. Wool is dyed from the aqueous solution in bright blue shades fast to milling and severe washing.

*Example 2.*—100 part of 2-bromo-1-amino-4-o-carbododecoxyanilinoanthraquinone (made as below), 500 parts of phenol, 180 parts of sodium sulfite crystals and 250 parts of water are heated in an autoclave fitted with a stirrer at 165° C. for 6 hours. After cooling, the phenol is removed by steam distillation and the product filtered off from the cooled liquor and washed with cold water. The crude 1-amino-4-o-carbododecoxyanilinoanthraquinone-2-sulfonic acid is purified by washing with warm ligroin (B. P. 100–120° C.). A blue powder is thus obtained which dissolves in concentrated sulfuric acid to a greenish-blue solution, and in water to a bright blue solution which will give a froth when shaken and from which wool is dyed in bright blue shades fast to milling and severe washing.

2-bromo-1-amino-4-o-carbododecoxyanilinoanthraquinone is made as follows. 100 parts of 2-bromo-1-amino-4-o-carboxyanilinoanthraquinone are esterified by heating with 500 parts of dodecyl alcohol and 20 parts of 100% sulfuric acid in an open vessel at 160° C. for 30 minutes, water being allowed to escape. After cooling to 100° C., 1500 parts of ethyl alcohol are added and the ester filtered off at 40° C. It is washed with ethyl alcohol and with water and dried at 50° C. The new ester is obtained in the form of violet-blue crystals which dissolve in cold benzene with a bright blue colour.

*Example 3.*—30 parts of 1-methylamino-4-o-carbododecoxyanilinoanthraquinone (made as below) are dissolved in 300 parts of chloroform at 25–30° C. and 40 parts of chlorosulfonic acid are added, the temperature being kept below 30° C. After stirring 15 minutes the sulfonation mixture is poured into a mixture of ice and water and the chloroform distilled off in steam. When the liquor is cooled the dyestuff has separated, it is filtered off, washed with 1% salt solution and dried at 100° C.

The new dyestuff 1-methylamino-4-o-carbododecoxyanilinoanthraquinonesulfonic acid is a dark blue powder which dissolves in concentrated sulfuric acid with reddish-blue colour and in boiling water to a bright greenish-blue frothy solution which dyes wool in greenish-blue shades fast to milling and severe washing.

1-methylamino-4-o-carbododecoxyanilinoanthraquinone is made as follows. 50 parts of 1-methylamino-4-o-carboxyanilinoanthraquinone (made from 1-bromo-4-methylaminoanthraquinone and anthranilic acid), 250 parts of dodecyl alcohol and 10 parts of 100% sulfuric acid are heated together to 150° C. for 30 minutes, the water formed being allowed to escape. The esterified product is isolated by diluting with 1000 parts of ethyl alcohol at 100° C., cooling to 40° C., filtering and washing with ethyl alcohol and water. After drying at 50° C. the product is crystallized from butyl alcohol. Dark blue crystals are obtained which dissolve in concentrated sulfuric acid with a reddish-blue colour and in cold benzene with bright greenish-blue colour.

Another and similar new dyestuff, which has the methyl substituent in the 2-position in the anthraquinone nucleus instead of in the amino substituent, namely, 1-amino-2-methyl-4-o-carbododecoxyanilinoanthraquinonesulfonic acid can be made in a similar way to the new dyestuff above, namely, by sulfonating 1-amino-2-methyl-4-o-carbododecoxyanilinoanthraquinone with chlorosulfonic acid. 1-amino-2-methyl-4-o-carbododecoxyanilinoanthraquinone is made by interacting 1-amino-2-methyl-4-bromoanthraquinone with anthranilic acid and then esterifying with dodecyl alcohol.

*Example 4.*—50 parts of 1-amino-4-m-carboxyanilinoanthraquinone-2-sulfonic acid (see Example 1), 150 parts of decyl alcohol and 7 parts of chlorosulfonic acid are heated together at 145° C. for 1 hour. Water produced during the reaction is allowed to escape. The mixture is cooled to 80° C., diluted with 400 parts of benzene and filtered. The crystalline product is washed with benzene, dried at 80° C., dissolved in 3000 parts of water at 80° C., neutralized with sodium carbonate and precipitated from solution with sodium chloride. It is filtered, washed with 5% sodium chloride solution and dried.

The so obtained new dyestuff 1-amino-4-m-carbodecyloxyanilinoanthraquinone-2-sulfonic acid has similar properties to the dyestuff of Example 1.

When cetyl and octadecyl alcohols are used instead of decyl alcohol the corresponding cetyl and octadecyl ester dyestuffs are obtained, and these dye wool in bright blue shades of very good fastness to severe washing and milling.

*Example 5.*—50 parts of 1-amino-4-m-carboxyanilinoanthraquinone-2-sulfonic acid (see Example 1), 250 parts of oleyl alcohol and 5 parts of chlorosulfonic acid are stirred at 150° C. for 2 hours, allowing the water formed to escape. The mixture is dissolved in 1200 parts of acetic acid at 100° C., 100 parts of hydrochloric acid and 1000 parts of ligroin (B. P. 60–80° C.) are added. The suspended product is filtered off, washed with ligroin and dried at 80° C. It is neutralized with sodium carbonate in 3000 parts of water and precipitates at 80° C. with sodium chloride. After filtering it cold, it is washed with 5% sodium chloride solution and dried.

The so-obtained new dyestuff, 1-amino-4-m-carbooleyloxyanilinoanthraquinone-2-sulfonic acid, dyes wool bright blue shades of very good fastness to severe washing and milling.

*Example 6.*—40 parts of 1-hydroxy-4-m-carboxyanilinoanthraquinone-2-sulfonic acid (obtained by reacting 1:3-dibromo-4-hydroxyanthraquinone with m-aminobenzoic acid and sulfonating the product with sodium sulfite in phenol under pressure), 160 parts of dodecyl alcohol and 7 parts of chlorosulfonic acid are stirred at 165° C. for 1 hour. The water formed during the reaction is allowed to escape. After cooling to 70° C. 500 parts of ligroin are added and the suspended product filtered, washed with ligroin and dried. It is then converted to the soluble sodium salt by neutralizing with sodium carbonate in 2000 parts of water at 80° C., this is precipitated with sodium chloride, washed with a little 2% sodium chloride solution and dried.

The so-obtained new dyestuff, 1-hydroxy-4-m-carbododecyloxyanilinoanthraquinone-2-sulfonic acid, is a violet powder which dyes wool from a neutral or weakly acid bath in bright violet shades of very good fastness properties.

*Example 7.*—20 parts of 1-methylamino-4-m-carboxyanilinoanthraquinone-2-sulfonic acid (obtained by reacting 1-bromo-4-methylaminoanthraquinone-3-sulfonic acid with m-aminobenzoic acid), 160 parts of dodecyl alcohol and 1.6 parts of chlorosulfonic acid are heated and stirred at 160–165° C., for three quarters of an hour. The reaction mixture, after cooling, is dissolved in methyl alcohol, sufficient sodium hydrochloride is added to neutralize, and the alcohol is then removed by evaporation. Low boiling petroleum ether is now mixed in and the insoluble product filtered and well washed with this solvent. It is dried, dissolved in boiling water and precipitated by adding sodium chloride. When dry, the dyestuff is a blue powder, soluble in hot water to a bright blue solution. Wool is dyed in shades similar to the dyestuff of Example 1 and the dyeings show similar fastness to severe washing and milling.

Example 8.—50 parts of sodium 2-bromo-1-amino-4-m-carboxyanilinoanthraquinone-6-sulfonate, 250 parts of dodecyl alcohol and 10 parts of chlorosulfonic acid are stirred in an open vessel at 150° C. for 1 hour. After cooling to 100° C., the mixture is poured into 2500 parts of ethyl alcohol, cooled and filtered. The crude ester is washed with ligroin (B. P. 40-60° C.), dissolved in 3000 parts of water by addition of sodium carbonate, precipitated with sodium chloride and filtered. After washing with 2% sodium chloride solution it is dried at 50° C.

The new dyestuff, 2-bromo-1-amino-4-m-carbododecoxyanilinoanthraquinone-6-sulfonic acid, is sparingly soluble in warm water and dyes wool from a neutral or weakly acid bath in reddish-blue shades.

Another new dyestuff, namely, 1-amino-4-carbododecoxyanilinoanthraquinone-2:6-disulfonic acid, i. e. a dyestuff containing two sulfonic acid groups, may be obtained by heating the dyestuff of Example 8 with sodium sulfite in a mixture of water and phenol. This dyestuff dyes wool in similar shades to the monosulfonic acid, but it has the advantage of having higher solubility.

Example 9.—100 parts of 2-bromo-1-amino-4-m-carbododecoxyanilinoanthraquinone (obtained in a similar manner to the o-carbododecyl ester of Example 2), 500 parts of phenol, 180 parts of sodium sulfite crystals and 250 parts of water are heated in an autoclave fitted with a stirrer at 160° C. for 6 hours. After cooling, the phenol is removed in steam and the product which separates on addition of sodium chloride is filtered and washed with cold water. It is dried and purified by extracting soluble impurity with warm ligroin. A blue powder is obtained which is identical with the product of Example 1.

As many apparently widely different embodiments of this invention may be made without departing from the spirit and scope thereof, it is to be understood that we do not limit ourselves to the specific embodiments thereof except as defined in the appended claims.

We claim:

1. Sulfonic acids of compounds of the formula

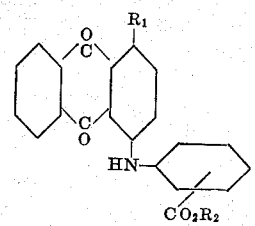

in which $R_1$ stands for a substituent chosen from the group consisting of hydroxy, amino and methylamino, $R_2$ is a radical of the class consisting of alkyl and alkenyl radicals of 8-18 carbon atoms, and in which there may be not more than two additional substituents chosen from the group consisting of halogen and methyl.

2. Alkyl and alkenyl esters of 1-amino-4-carboxyanilinoanthraquinone-2-sulfonic acid, in which the alkyl and alkenyl radicals have 8-18 carbon atoms.

3. 1-amino-4-m-carbododecoxyanilinoanthraquinone-2-sulfonic acid.

4. 1-amino-4-o-carbododecoxyanilinoanthraquinone-2-sulfonic acid.

5. Process for the manufacture of the new compounds claimed in claim 1, which comprises treating a compound of the formula shown in claim 1 with a sulfonating agent.

6. Process for the manufacture of the new compounds claimed in claim 1, which comprises esterifying a compound of the formula

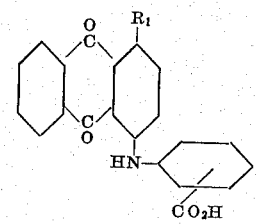

in which $R_1$ stands for a substituent chosen from the group consisting of hydroxy, amino and methylamino, with a member of the group consisting of an alkyl and alkenyl alcohol of 8-18 carbon atoms.

7. Process as claimed in claim 6 in which the esterification is effected in the presence of a catalyst for the esterification of the class consisting of chlorosulfonic acid and sulfuric acid.

NORMAN HULTON HADDOCK.
FRANK LODGE.